United States Patent
Mohandas et al.

(10) Patent No.: US 9,398,629 B2
(45) Date of Patent: Jul. 19, 2016

(54) SYSTEM AND METHOD FOR A DISTRIBUTED WIRELESS NETWORK

(71) Applicant: Alcatel-Lucent USA Inc., Murray Hill, NJ (US)

(72) Inventors: Sindhu K. Mohandas, Thousand Oaks, CA (US); Abhishek Sinha, Woodland Hills, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 25 days.

(21) Appl. No.: 14/303,637

(22) Filed: Jun. 13, 2014

(65) Prior Publication Data

US 2015/0365911 A1  Dec. 17, 2015

(51) Int. Cl.
*H04W 4/00* (2009.01)
*H04W 76/02* (2009.01)
*H04W 56/00* (2009.01)
*H04W 24/02* (2009.01)
*H04W 84/12* (2009.01)
*H04W 88/12* (2009.01)

(52) U.S. Cl.
CPC ............ *H04W 76/021* (2013.01); *H04W 24/02* (2013.01); *H04W 56/001* (2013.01); *H04W 84/12* (2013.01); *H04W 88/12* (2013.01)

(58) Field of Classification Search
None
See application file for complete search history.

(56) References Cited

U.S. PATENT DOCUMENTS

| 2003/0037148 | A1* | 2/2003 | Pedersen | G06F 9/542 709/227 |
| 2008/0080414 | A1* | 4/2008 | Thubert | H04W 76/022 370/328 |
| 2010/0041405 | A1* | 2/2010 | Gallagher | H04W 8/02 455/436 |
| 2012/0259992 | A1* | 10/2012 | Koehler | H04W 76/022 709/229 |
| 2014/0003282 | A1* | 1/2014 | Kafle | H04W 48/14 370/254 |
| 2015/0304886 | A1* | 10/2015 | Liu | H04W 28/08 370/230 |

* cited by examiner

*Primary Examiner* — Kevin C Harper
(74) *Attorney, Agent, or Firm* — Loza & Loza, LLP (57) ABSTRACT

WLAN controllers in a same mobility domain are able to dynamically discover other WLAN controllers in the same mobility domain across one or more layer 2 or layer 3 network boundaries. A WLAN controller in the mobility domain determines an address of at least one seed WLAN controller in the mobility domain from a configuration server. The WLAN controller registers with the at least one seed WLAN controller in the mobility domain and receives information for other WLAN controllers in the mobility domain from the at least one seed WLAN controller. The WLAN controller also receives synchronized wireless device information that allows a wireless device to roam from one AP adopted by the WLAN controller in a first access network to another AP adopted by another WLAN controller in a second different access network in the same mobility domain.

18 Claims, 8 Drawing Sheets

SYSTEM AND METHOD FOR A DISTRIBUTED WIRELESS NETWORK

CROSS-REFERENCE TO RELATED PATENTS

Not Applicable.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not applicable.

BACKGROUND

1. Technical Field

This application relates generally to communications and in particular to systems and methods for distributed wireless networks.

2. Description of Related Art

This section describes related art, and accordingly, the statements in this section are not admissions of prior art.

Communication systems are known to support wireless and wire lined communications between wireless and/or wire lined devices. Such communication systems range from national and/or international cellular telephone systems to the Internet to point-to-point wireless networks. The communication systems may operate in accordance with one or more communication standards. For instance, wireless communication systems may operate in accordance with one or more standards including, but not limited to, IEEE 802.11 standards, WiMAX, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless device, such as a wireless local area network (WLAN) telephone, personal or laptop computer, smart tablet, camera, entertainment equipment, set-top box, two-way radio, personal digital assistant (PDA), etc. communicates directly or indirectly with other wireless devices. For direct communications (also known as point-to-point communications), the participating wireless devices tune their receivers and transmitters to the same channel or channels (e.g., one of the plurality of radio frequency (RF) carriers of the wireless communication system) and communicate over that channel (s). For indirect wireless communications, a wireless device communicates directly with an associated access point (e.g., for an 802.11 type WLAN) via an assigned channel.

To complete a communication connection between wireless devices, the associated access points communicate with each other directly or through wireless local area network (WLAN) controllers. A typical wireless network architecture restricts the location of WLAN controllers in a same mobility domain to a single layer 2 network. This restriction allows WLAN controllers to discover other WLAN controllers in the same mobility domain using layer 2 broadcast protocols within the single layer 2 network. A more flexible solution is needed to provide for more distributed wireless network architectures.

SUMMARY

In an embodiment, a wireless local area network (WLAN) controller in a mobility domain comprises at least one memory and a processing module operable to determine an address of at least one seed WLAN controller in the mobility domain; register with the at least one seed WLAN controller in the mobility domain; and receive information for other WLAN controllers in the mobility domain from the at least one seed WLAN controller.

In another embodiment, a method for discovery by a WLAN controller in a mobility domain comprises determining a layer 3 address of at least one seed WLAN controller in the mobility domain; registering with the at least one seed WLAN controller in the mobility domain; receiving information for other WLAN controllers in the mobility domain from the at least one seed WLAN controller; and receiving synchronized wireless device information from the at least one seed WLAN controller in the mobility domain.

In still another embodiment, a WLAN controller in a mobility domain comprises at least one memory and at least one processing module operable to register with the at least one seed WLAN controller in the mobility domain; receive address information for other WLAN controllers in the mobility domain from the at least one seed WLAN controller; receive synchronized wireless device information from the at least one seed WLAN controller in the mobility domain; intercept a control message from a configuration server to an access point, wherein the control message includes a global list of WLAN controllers in the mobility domain; alter the global list of WLAN controllers to generate an altered list of WLAN controllers; and transmit the control message to the access point with the altered list of WLAN controllers.

In still another embodiment, a WLAN controller in a mobility domain is operable to intercept a control message from a configuration server to an access point, wherein the control message includes a global list of WLAN controllers; alter the global list of WLAN controllers to generate an altered list of WLAN controllers; and transmit the control message to the access point with the altered list of WLAN controllers.

In some embodiments of any of the above apparatus/methods, the WLAN controller is operable to register with the at least one seed WLAN controller in the mobility domain by: transmitting a register request including a layer 3 address of the WLAN controller to the at least one seed WLAN controller with a mobility domain identifier of the mobility domain; and receiving a register acknowledgement from the at least one seed WLAN controller when the mobility domain identifier matches a mobility domain identifier of the at least one seed WLAN controller.

In some embodiments of any of the above apparatus/methods, the information for other WLAN controllers in the mobility domain from the at least one seed WLAN controller includes at least an IP address for the other WLAN controllers in the mobility domain.

In some embodiments of any of the above apparatus/methods, the WLAN controller is in a first access network and wherein the at least one seed WLAN controller is in a second, different access network. In some embodiments of any of the above apparatus/methods, the first access network includes at least one of: a layer 2 network and a layer 3 network and wherein the second, different access network includes at least a different one of: a layer 2 network and a layer 3 network.

In some embodiments of any of the above apparatus/methods, the WLAN controller is further operable to receive synchronized wireless device information from the at least one seed WLAN controller in the mobility domain. In some embodiments of any of the above apparatus/methods, the synchronized wireless device information includes information to allow a wireless device to roam between a first AP adopted by the WLAN controller in the first access network and a second AP adopted by the seed WLAN controller in the second, different access network.

In some embodiments of any of the above apparatus/methods, the WLAN controller is operable to determine an address of at least one seed WLAN controller in the mobility domain by transmitting a discover request to a configuration server and receiving a discover response that includes the address of the at least one seed WLAN controller.

In some embodiments of any of the above apparatus/methods, the WLAN controller is operable to intercept a control message from a configuration server to an access point, wherein the control message includes a global list of WLAN controllers; alter the global list of WLAN controllers to generate an altered list of WLAN controllers; and transmit the control message to the access point with the altered list of WLAN controllers.

In some embodiments of any of the above apparatus/methods, the AP is directly connected to the WLAN controller, and the WLAN controller alters the global list of WLAN controllers to generate an altered list of WLAN controllers by inserting an address of the WLAN controller and re-prioritizing the global list of WLAN controllers such that the address of the WLAN controller has a highest priority address in the altered list of WLAN controllers.

In some embodiments of any of the above apparatus/methods, the AP is indirectly connected to the WLAN controller, and the WLAN controller is operable to alter the global list of WLAN controllers to generate an altered list of WLAN controllers by inserting an address of the WLAN controller and re-prioritizing the global list of WLAN controllers such that the address of the WLAN controller has a highest priority address in the altered list of WLAN controllers.

BRIEF DESCRIPTION OF THE DRAWINGS

Some embodiments of apparatus and/or methods are now described, by way of example only, and with reference to the accompanying drawings, in which.

DETAILED DESCRIPTION OF ILLUSTRATIVE EMBODIMENTS

A mobility domain includes a plurality of wireless local area network (WLAN) controllers that are configured with a mobility list including each other's layer 2 (such as Ethernet MAC addresses) and Layer 3 addresses (such as IP addresses), allowing wireless devices to seamlessly roam between the WLAN controllers in the mobility domain. WLAN controllers in a mobility domain need to dynamically discover other WLAN controllers in the same mobility domain and to share information and forward data traffic, e.g. when inter-controller roaming occurs. To ensure discovery of other WLAN controllers in the same mobility domain, a typical wireless network architecture restricts the location of WLAN controllers in a same mobility domain to a single layer 2 network. This restriction allows WLAN controllers to discover other WLAN controllers in the same mobility domain using layer 2 broadcast protocols within the single layer 2 network. Unfortunately, there is no current mechanism for dynamically discovering WLAN controllers that are distributed across layer 2 (L2) and layer 3 (L3) network boundaries. Only a static configuration of WLAN controllers across L3 network boundaries currently exists. There is no scalable mechanism for discovering WLAN controllers dynamically at initial deployment into a network. As such, these known solutions do not allow for a scalable wireless distributed network with dynamic discovery of WLAN controllers spread across L2 and L3 boundaries.

In an embodiment, a wireless distributed network architecture is described that includes WLAN controllers in a same mobility domain located in a plurality of layer 2 (L2) and/or layer 3 (L3) networks. A WLAN controller discovery process is described that allows WLAN controller discovery between WLAN controllers in a mobility domain having network connectivity that are spread across one or more L2 and/or L3 network boundaries. In addition, an embodiment described herein provides for dynamic adoption of access points (APs) by WLAN controllers in a wireless distributed network.

Figure 1:
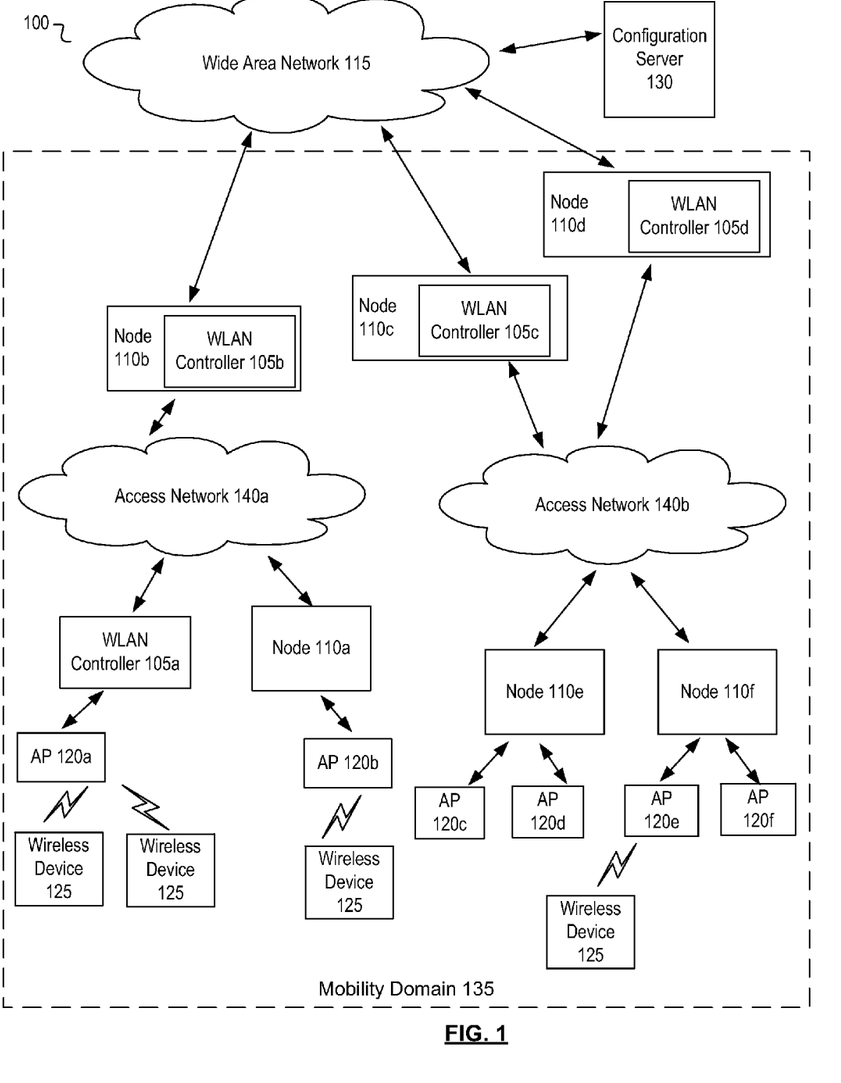
FIG. 1 illustrates a schematic block diagram of an embodiment of a wireless distributed network.

FIG. 1 illustrates a schematic block diagram of an embodiment of a wireless distributed network 100. The wireless distributed network 100 includes a plurality of WLAN controllers 105a-d deployed across one or more L2 and L3 access networks 140, e.g. L2 and/or L3 network boundaries separate one or more of the plurality of WLAN controllers 102. The access networks 140 include layer 2 networks, such as Ethernet networks, and/or L3 networks, such as IP networks. In an embodiment access network 140a and access network 140b are separately configured networks operated by different network providers or under control of different network managers. The access networks 140a and 140b are operably connected by a core or metro wide area network (WAN) 115. WAN network 115 is preferably a layer 3 core or metro network and may include internet connectivity as well as connectivity to the access networks 140a and 140b. Though FIG. 1 illustrates only two access networks 140, additional access networks 140 may be incorporated in the distributed network operably coupled by WAN 115 or by additional WANs 115, such as the internet.

The network nodes 110a-f may be similar devices or different devices, such as switches or routers. The network nodes 110a-f may have a multi-slot chassis-based architecture with a plurality of network interface modules or have a stackable node architecture and include a plurality of network elements coupled by a backplane. In another embodiment, a network node 110 includes a single module node architecture, such as a single stackable element or alternatively, a multi-slot chassis-based architecture with a single network interface module.

The WLAN controllers 105 include stand-alone wireless controllers, such as wireless controller 105a, or are WLAN controllers 105 incorporated in a network node 110, such as WLAN controllers 105b, 105c, and 105d. A wireless controller 105 is a device that can manage and control communications with a plurality of access points 120.

The access points (APs) 120 are devices capable of providing wireless local area network (WLAN) services and that can communicate with a WLAN controller 105. The access points 120 include fixed access points that are connected through a wire line connection to the WLAN controllers 105 and nodes 110 or the access points 120 may be roaming access points that are connected to the WLAN controllers 105 and network nodes through wireless connections. The access points 120 provide WLAN service to wireless devices 125. An example of a suitable technique for providing WLAN service includes operation in accordance with a WLAN protocol such as any of the protocols defined in the IEEE 802.11 set of standards, such as IEEE 802.11a/b/g/n/ac and further iterations thereof.

In an embodiment, the distributed network 100 includes configuration server 130, such as a dynamic host configuration protocol (DHCP) server or other type of node or device that provides configuration information to network nodes or has similar functionality as described herein with respect to configuration server 130. Dynamic Host Configuration Protocol (DHCP) is a standardized networking protocol used on Internet Protocol (IP) networks for dynamically distributing network configuration parameters as defined, inter alia, in IETF Network Working Group RFC 2131 Dynamic Host Configuration Protocol dated March 1997. Though DHCP and messages from the DHCP are described herein, other protocols may be utilized in addition to or alternatively from DHCP to provide the network configuration functionalities described herein. Configuration server 130 is operably connected to WAN 115 in the distributed wireless network 100 though it may also be connected to one of the access networks 140a or 140b or otherwise located within the distributed network 100. Configuration server 130 may be a standalone device or included within a network management system or within one or more other nodes of the distributed network 100.

The WLAN controllers 105 in distributed network 100 are configured with a same mobility domain identifier and are thus are in a same mobility domain 135. The WLAN controllers 105 include a mobility list including each other's layer 2 (such as Ethernet MAC addresses) and/or Layer 3 addresses (such as IP addresses) and exchange information, allowing wireless devices 125 to seamlessly roam between the WLAN controllers 105 in the mobility domain 135. For example, a wireless device may roam between APs 120 in the same mobility domain 135 without needing to perform authentication, such as IEEE 802.1X-based authentication, at each AP. The APs 120 in the same mobility domain 135 may perform, for example, fast Basic Service Set (BSS) transition services to provide seamless roaming. Fast BSS transition services is defined, inter alia, in IEEE 802.11r-2008 Fast Basic Service Set (BSS) dated Jul. 15, 2008.

However, APs 120 adopted by WLAN controllers 105 in different mobility domains are not allowed to perform fast BSS transition services and must require re-authentication of wireless devices 125 roaming from one AP 120 in a first mobility domain to a second AP 120 in another mobility domain. Thus, expanding the mobility domain to include WLAN controllers 105 in a plurality of different networks 140 aids in roaming of wireless devices 125 in a larger geographical area, such as a college campus, office complex or amusement park.

The WLAN controllers 105 in mobility domain 135 need to dynamically discover other WLAN controllers 105 in the same mobility domain across the one or more L2 and/or L3 access networks 140 in order to synchronize wireless device information, such as authentication status, QOS policies, FW policies, ACLs, etc. and to forward data traffic, e.g. when inter-controller roaming occurs. Keeping this information synchronized facilitates seamless mobility as wireless devices 125 roam from one AP 120 adopted by a WLAN controller 105 in a first access network 140a to another AP 120 adopted by another WLAN controller 105 in a second access network 140b, wherein both WLAN controllers 105 are configured with a same mobility domain 135. An embodiment described herein provides for discovery of devices across one or more L2 and L3 network boundaries, and in specific provides for dynamic discovery of WLAN controllers 105 in distributed wireless network 100.

Figure 2:
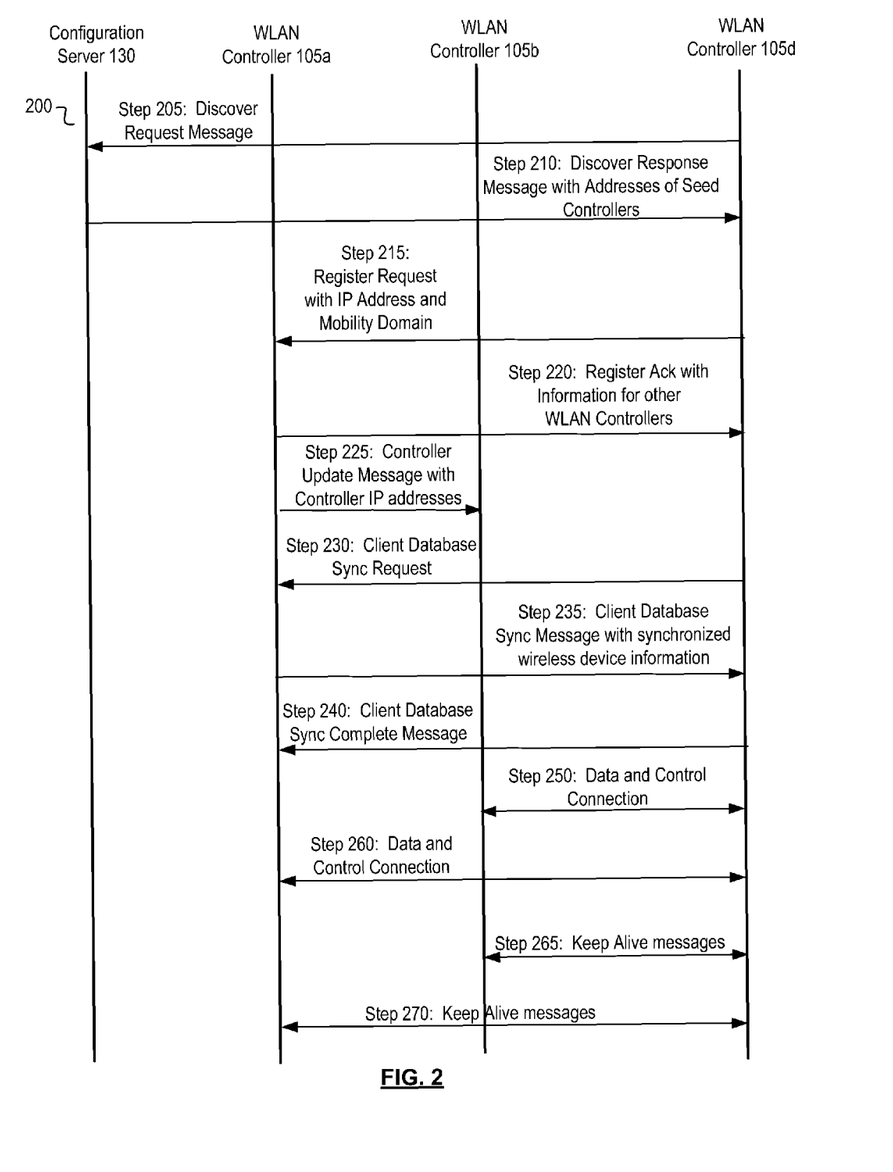
FIG. 2 illustrates a logical flow diagram of an embodiment of a method for discovery of a WLAN controller in a distributed wireless network.

FIG. 2 illustrates a logical flow diagram of an embodiment of a method 200 for discovery of a WLAN controller 105 in distributed wireless network 100. In an embodiment, at least one WLAN controller 105 is configured as a seed controller though in this example, for redundancy and resiliency reasons, two or more WLAN controllers 105 are configured as seed controllers. For example, referring to FIG. 1, WLAN controllers 105a and 105b are statically configured as seed controllers and, e.g., are assigned static IP addresses. The seed WLAN controllers 105a and 105b are also configured with a same mobility domain identifier for mobility domain 135. In addition, the seed WLAN controllers 105a and 105b may be configured with a controller group identifier, as described in more detail herein. The IP addresses for the one or more seed WLAN controllers is provided to the configuration server 130 with the associated mobility domain identifier for mobility domain 135. The MAC addresses for the one or more seed WLAN controllers may also be provided. The configuration server 130 stores the addresses for the one or more seed WLAN controllers 105a and 105b associated with mobility domain 135.

In this example, WLAN controller 105d is being deployed into the distributed network 100. WLAN controller 105d is located within a different network 110b than the seed WLAN controllers 105a and 105b. As seen in FIG. 1, seed WLAN controllers 105a and 105b are deployed in a first access network 140a while WLAN controller 105d is deployed in a second different access network 140b in mobility domain 135. Upon its deployment, WLAN controller 105d is configured with at least a mobility domain identifier corresponding to mobility domain 135. Other basic configuration parameters, such as its IP address and the controller group information, may also be configured. After configuration, WLAN controller 105d needs to discover and synchronize wireless device information with the other WLAN controllers 105 in mobility domain 135.

In an embodiment, WLAN controller 105d is initially configured with the IP addresses for the one or more seed WLAN controllers 105a and 105b at its deployment. Thus, WLAN controller 105d knows the IP address of the one or more seed WLAN controllers 105a and 105b and may begin the discovery process with step 215. In another embodiment, WLAN controller 105d is not initially configured with the IP address for the one or more WLAN controllers and must determine their addresses. In this embodiment, WLAN controller 105d transmits a discover request message to configuration server 130 in step 205 in FIG. 2. The discover request message includes the IP address of the newly deployed WLAN controller 105d and its associated mobility domain 135. Alternatively, the IP address of the newly deployed WLAN controller 105d and its associated mobility domain 135 may be transmitted by the WLAN controller 105d to the configuration server 130 in a separate register request message.

The configuration server 130 stores the IP address of the newly deployed WLAN controller 105d and its associated mobility domain 135. The configuration server 130 is configured to retrieve the addresses for the one or more seed WLAN controllers in the same mobility domain and to transmit a Discover Response Message with the addresses of the one or more seed controllers to WLAN controller 105d in step 210. The seed WLAN controller information includes at least the IP address for the one or more seed WLAN controllers and may also include other information, such as controller group identifier and MAC address. In this example, the IP addresses of the one or more WLAN controllers correspond to the IP addresses of WLAN controllers 105a and 105b.

The newly deployed WLAN controller 105d initiates a discovery protocol with one of the seed WLAN controllers 105a and 105b. The discovery protocol may be a proprietary protocol or may use a User Datagram Protocol (UDP) or Transmission Control Protocol (TCP) protocol to perform the functions described herein. The newly deployed WLAN controller 105d selects one of the seed WLAN controllers 105a and 105b. The selection may be based on an order or priority of the IP addresses of the seed WLAN controllers 105a and 105b in the Discover Response Message or based on other criteria. In this example, newly deployed WLAN controller 105d selects seed WLAN controller 105a though the process would be similar if seed WLAN controller 105b is selected.

The newly deployed WLAN controller 105d transmits a register request message to the selected seed WLAN controller 105a, wherein the register request message includes at least its IP address and mobility domain identifier corresponding to mobility domain 135 as shown in Step 215. The register request message may include other configuration parameters of the newly deployed WLAN controller 105d, such as the controller group identifier and MAC address. The seed WLAN controller 105a verifies that the mobility domain of the newly deployed WLAN controller 105d matches its own mobility domain. When it matches, the seed WLAN controller 105a accepts the registration of the newly deployed WLAN controller 105a and transmits a register acknowledgment (Ack) message of success in step 220. The register Ack message includes information for the other WLAN controllers 105 registered in the same mobility domain 135. This WLAN controller information for the other WLAN controllers 105 includes at least the IP address of the WLAN controllers 105 and may also include other information, such as the controller group information and MAC addresses of the other WLAN controllers 105.

Additionally, the seed WLAN controller 105a transmits a controller update message as shown in step 225 including information of the newly registered WLAN controller 105d to the other WLAN controllers (e.g., WLAN controllers 105b and 105c) in the mobility domain 135. The information of the newly registered WLAN controller 105d includes at least the IP address of the WLAN controller 105d and may also include other information, such as the controller group information and MAC address of WLAN controller 105d.

The newly registered WLAN controller 105d transmits a client database synchronization request to seed WLAN controller 105a in step 230. The seed WLAN controller 105a then transmits a client database synchronization message to the newly registered WLAN controller 105d in step 235. The client database synchronization message includes synchronized wireless device information, such as authentication status, quality of service (QOS) policies, forwarding (FW) policies, access control lists (ACLs), etc., for wireless devices 125 associated with a plurality of APs 120 in the mobility domain 135. The synchronized wireless device information allows the wireless devices 125 to roam between the APs adopted by the WLAN controllers 105 in mobility domain 135. The newly registered WLAN controller 105d transmits a client database synchronization complete message to the seed WLAN controller 105a when synchronization is completed, as shown in step 240.

Control and data path connections are then setup between the newly registered WLAN controller 105d and the other WLAN controllers 105b, 105c in the mobility domain 135 including the seed WLAN controller 105a as shown in steps 250 and 260 to form a mesh of control and data connections. This mesh of control and data connections between the WLAN controllers 105 facilitates seamless roaming of the wireless devices 125 moving across APs that are controlled by different WLAN controllers 105 in the mobility domain 135. To track the other WLAN controllers 105 in the mobility domain 135, the WLAN controllers 105 exchange keep alive messages or other types of tracking messages as shown in steps 265 and 270.

The WLAN controllers 105 in mobility domain 135 are thus able to dynamically discover other WLAN controllers 105 in the same mobility domain across one or more L2 and/or L3 network boundaries in order to synchronize wireless device information for wireless devices 125 associated with a plurality of APs 120 in the mobility domain 135, such as authentication status, QOS policies, FW policies, ACLs, etc. This process facilitates seamless mobility as wireless devices 125 roam from one AP 120 adopted by a WLAN controller 105 in a first access network to another AP 120 adopted by another WLAN controller 105 in a second different access network in mobility domain 135.

Another problem encountered in a distributed wireless network involves adoption of APs 120 by the WLAN controllers 105. Currently, WLAN controllers are either statically configured on the APs or the APs receive a static list of addresses of the WLAN controllers through a DHCP request or the APs receive a list of addresses of the WLAN controllers using a L2 discovery mechanism. However, the L2 discovery mechanism only allows discovery of WLAN controllers within the same L2 network as the AP. This L2 discovery mechanism does not allow discovery across L2 or L3 network boundaries. With respect to the DHCP request option, the APs use the DHCP services in their native VLAN for network addressing and to receive a list of WLAN controller IP addresses from the DHCP server. Currently though, every AP connected throughout the network receives one list of WLAN controllers from the DHCP server, e.g. a static list of WLAN controllers deployed in the network. This option fails to adapt to new WLAN controllers that are deployed in the network. And this option is not sufficient when the WLAN controllers are distributed across a plurality of L2 or L3 networks in a mobility domain. These solutions do not work well in a distributed WLAN controller deployment with hundreds of WLAN controllers across multiple networks wherein the APs may be directly connected or indirectly connected through a L2 or L3 network to a WLAN controller. As such, there is a need for dynamic adoption of APs by WLAN controllers in a wireless distributed network.

An AP 120 needs connectivity to a WLAN controller 105 to function. The WLAN controller 105 may be directly connected to the AP 120 (e.g. no intervening nodes between the WLAN controller 105 and the AP 120) or may be indirectly connected to the AP 120 (e.g., reachable through one or more nodes or one or more L2 or L3 networks 110, 115). The process of an AP 120 discovering a WLAN controller 105 and requesting association with the WLAN controller 105 is referred to herein as the "adoption" process. An embodiment described herein enhances DHCP services when configuration server 130 provides a WLAN controller list to an AP 120 during the adoption process. In this embodiment, WLAN controllers 105 in mobility domain 135 intelligently influence the WLAN controller list transmitted to the AP 120 from the configuration server 130 using a feature called snooping. Though DHCP and messages from the DHCP are described herein, other protocols may be utilized in addition to or alternatively from DHCP to provide the network configuration functionalities described herein.

In an embodiment, configuration server 130 includes a global list of WLAN controllers in mobility domain 135. Using snooping, a WLAN controller 105 intercepts a message from the configuration server 130 to an AP that includes the global list of WLAN controllers during the adoption process. In general, an AP selects the WLAN controller listed first or given highest priority in the global list from the configuration server 130. The WLAN controller snoops the message from the configuration server 130 and alters the global list of WLAN controllers to generate an altered list of WLAN controllers to affect the selection decision of the AP. The altered list re-orders or re-prioritizes the WLAN controllers as following with respect to the AP: directly connected WLAN controller, WLAN controllers from a same controller group, and then any remaining WLAN controllers in the global controller list provided by the configuration server 130. The WLAN controller then transmits the altered list of WLAN controllers to the AP.

Figure 3:
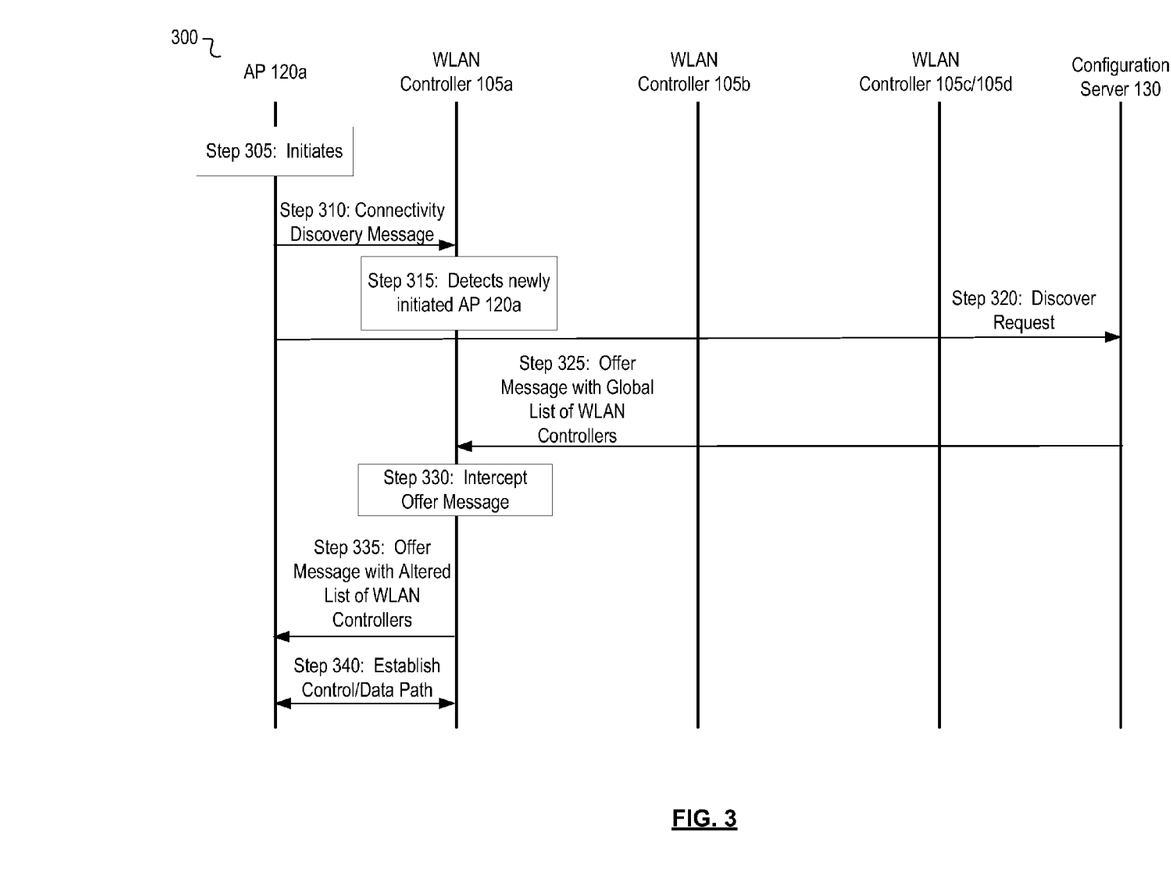
FIG. 3 illustrates a logical flow diagram of an embodiment of a method for establishing an association between an access point and a WLAN controller.

FIG. 3 illustrates a logical flow diagram of an embodiment of a method 300 for establishing an association between an AP 120 and a WLAN controller 105 in mobility domain 135 when the AP 120 and WLAN controller 105 are directly connected. Referring to the distributed network 100 shown in FIG. 1, in this embodiment, AP 105a is newly deployed. AP 105a is directly connected to WLAN controller 105a, e.g. no intervening nodes are between WLAN controller 105a and AP 105a. For example, AP 105a is directly connected to a port of WLAN controller 105a either through a wireline or wireless connection.

When AP 120a is newly deployed in step 305, it begins initiation in the distributed wireless network 100. In this embodiment as part of the initiation, AP 120a employs a connectivity discovery protocol to transmit messages that advertise its identity to other nodes in the network in step 310. For example, AP 120a may use the Link Layer Discovery Protocol (LLDP) defined in IEEE 802.1AB-REV Station and Media Access Control Connectivity Discovery dated Sep. 11, 2009 to advertise its IP address, identity, capabilities, and neighbors. Other connectivity discovery protocols may be implemented by AP 120a, such as the Cisco Discovery Protocol (CDP), Extreme Discovery Protocol, Nortel Discovery Protocol (also known as SONMP), and Microsoft's Link Layer Topology Discovery (LLTD). Through the connectivity discovery protocol message from AP 120a, WLAN controller 105a determines that it is directly connected to AP 120a in step 315.

AP 120a transmits a discover request message to determine its IP address from configuration server 130 in step 320. The discover request message may include for example a DHCP discover message with a DHCP option 60 with VCI="VendorDeviceClassDescription". Upon receiving the discover request message, configuration server 130 is configured to return an offer message with a global list of WLAN controllers in step 325. The offer message may include for example a DHCP offer with DHCP option 40 with VSI=global list of WLAN controllers=IP address of one or more WLAN controllers. The global list of WLAN controllers from the configuration server 130 includes the IP addresses of one or more WLAN controllers 105 in mobility domain 135. The global list of WLAN controllers from the configuration server 130 is in an embodiment a static list.

WLAN controller 105a intercepts or "snoops" the offer message from configuration server 130 to AP 120a in step 330. For example, when WLAN controller 105a determines that it is directly connected to newly initiated AP 120a, it begins to monitor or snoop the control virtual local area network (VLAN) of AP 120a. For example, the WLAN controller 105a may execute a snoop command on the control VLAN of AP 120a. WLAN controller 105a is then able to read the various messages transmitted having this control VLAN id. When WLAN controller 105a receives the offer message from configuration server 130 to AP 120a, it intercepts the offer message. WLAN controller 105a alters the global list of WLAN controllers in the offer message to create an altered list of WLAN controllers. The altered list of WLAN controllers includes the IP address of WLAN controller 105a as the first IP address or highest priority address in the list. In step 335, WLAN controller 105a transmits the offer message with the altered list of WLAN controllers.

AP 105a receives the offer message and selects the IP address listed first or given highest priority in the altered list of WLAN controllers, e.g. WLAN controller 105a. AP 105a in step 340 then requests association with (or adoption by) WLAN controller 105a to establish a control and data path connection in step 340. When AP is associated with or adopted by the WLAN controller 105a, WLAN controller 105a receives and manages AP wireless device connections, authentications, and other wireless services.

Using this interception process, AP 105a is thus influenced to select the directly connected WLAN controller 105a for association even when the directly connected WLAN controller 105a is not initially on the global list of WLAN controllers or is not prioritized in the global list of WLAN controllers from the configuration server 130.

Figure 4:
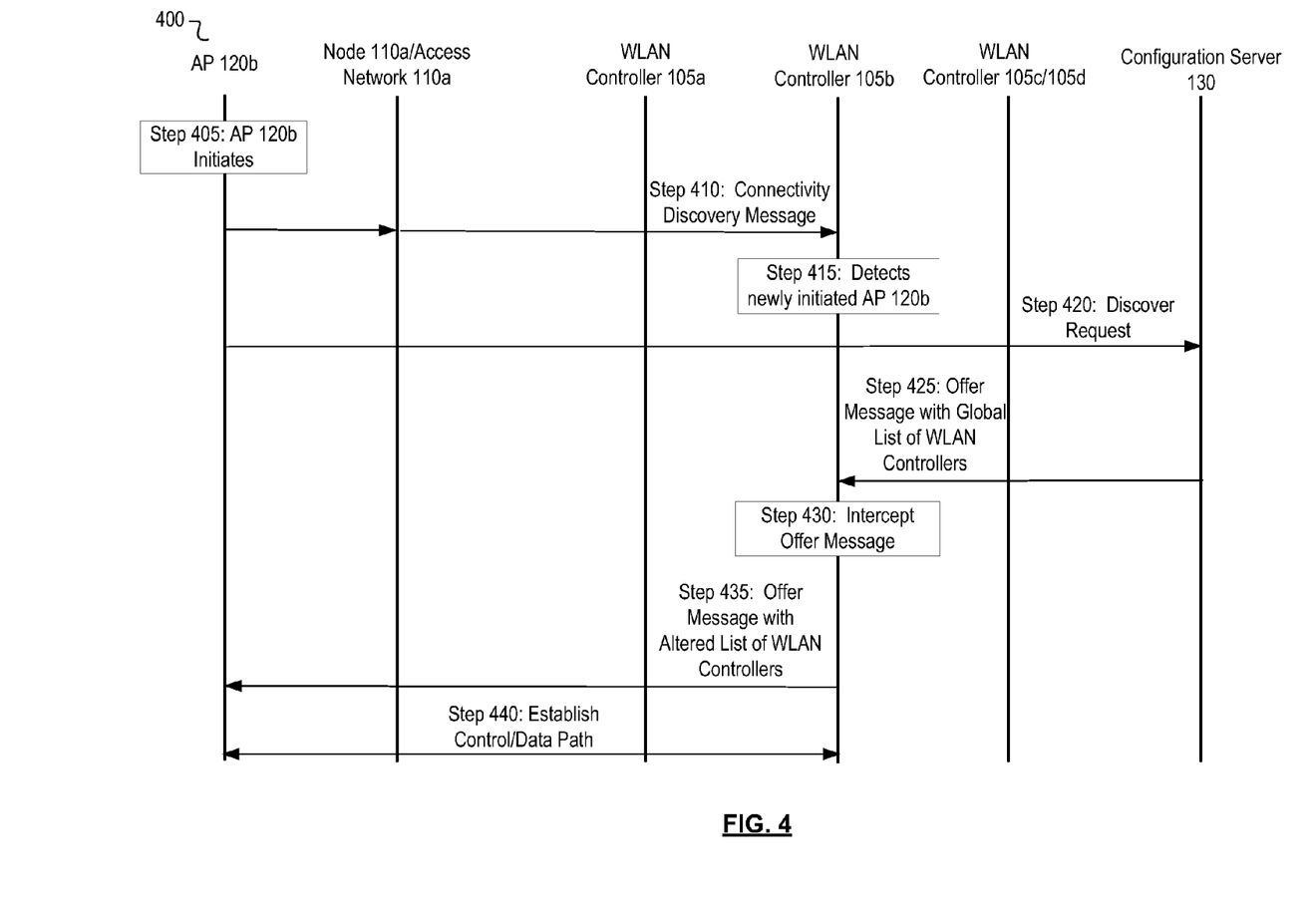
FIG. 4 illustrates a logical flow diagram of another embodiment of a method for establishing an association between an access point and a WLAN controller.

FIG. 4 illustrates a logical flow diagram of another embodiment of a method 400 for establishing an association between an access point and a WLAN controller when the WLAN controller is indirectly connected to the AP. In this embodiment, WLAN controller is connected to a same layer 2 network as the AP but is not directly connected, e.g. one or more nodes are connected between the WLAN controller and the AP. For example, in FIG. 1, AP 120b is indirectly connected to WLAN controller 105b through access network 140a and node 110a. AP 120b is directly connected to node 110a but is indirectly connected to WLAN controller 105b via node 110a and any other nodes in access network 140a.

When AP 120b is newly deployed in step 405, it begins initiation in the distributed wireless network 100. In this embodiment as part of the initiation, AP 120b employs a connectivity discovery protocol to transmit messages that advertise its identity to other nodes in the network 110a in step 410. Through the connectivity discovery protocol message from AP 120b, WLAN controller 105b determines that it is indirectly connected to AP 120b in step through access network 110a in step 415.

AP 120b transmits a discover request message to determine its IP address from configuration server 130 in step 420. The discover request message may include for example a DHCP discover message with a DHCP option 60 with VCI="VendorDeviceClassDescription". Upon receiving the discover request message, configuration server 130 is configured to return an offer message with a global list of WLAN controllers in step 425. The offer message may include for example a DHCP offer with DHCP option 40 with VSI=global list of WLAN controllers=IP address of one or more WLAN controllers. The global list of WLAN controllers from the configuration server 130 includes the IP addresses of one or more WLAN controllers 105 in mobility domain 135. The global list of WLAN controllers from the configuration server 130 is in an embodiment a static list.

WLAN controller 105b intercepts or "snoops" the offer message from configuration server 130 to AP 120b in step 430. For example, when WLAN controller 105b determines that it is indirectly connected to newly initiated AP 120a through access network 110a, it begins to snoop or monitor the control virtual local area network (VLAN) of AP 120b. When WLAN controller 105b receives the offer message from configuration server 130 to AP 120b, it intercepts the offer message. WLAN controller 105b alters the global list of WLAN controllers in the offer message to create an altered list of WLAN controllers. The altered list of WLAN controllers includes the IP address of WLAN controller 105b as the first IP address or highest priority address in the list. In step 435, WLAN controller 105b transmits the offer message with the altered list of WLAN controllers.

AP 105a receives the offer message and selects the IP address listed first or given highest priority in the altered list of WLAN controllers, e.g. WLAN controller 105b. AP 105b in step 440 then requests association with (or adoption by) WLAN controller 105a to establish a control and data path connection. When AP 120b is associated with or adopted by the WLAN controller 105b, WLAN controller 105b receives and manages AP wireless device connections, authentications, and other wireless services.

Using this interception process, AP 105b is thus influenced to select the indirectly connected WLAN controller 105b for association even when the indirectly connected WLAN controller 105b is not initially on the global list of WLAN controllers or is not prioritized in the global list of WLAN controllers from the configuration server 130.

Figure 5:
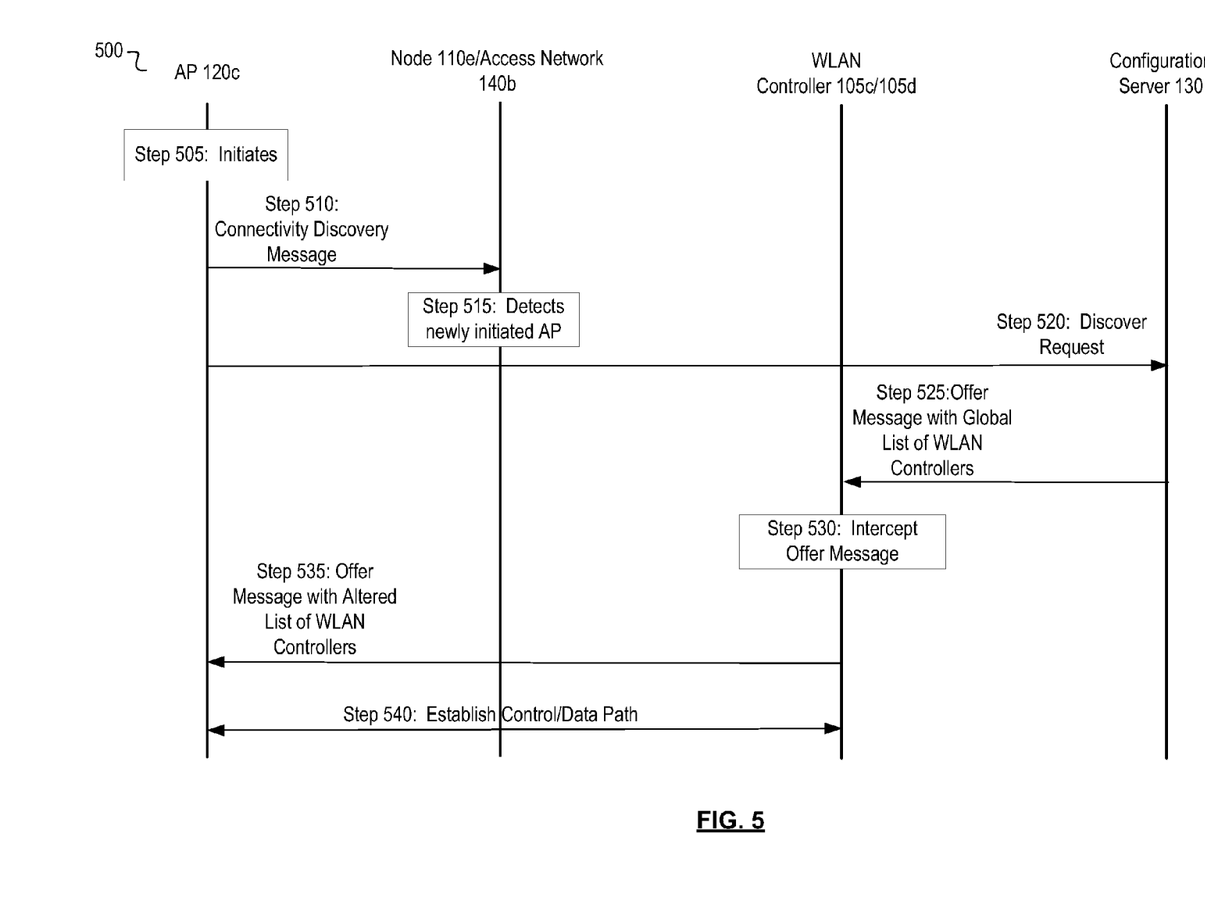
FIG. 5 illustrates a logical flow diagram of another embodiment of a method for establishing an association between an access point and a WLAN controller.

FIG. 5 illustrates a logical flow diagram of another embodiment of a method 500 for establishing an association between an AP 120 and a WLAN controller 105 in mobility domain 135 when the AP 120 and WLAN controller 105 are indirectly connected via a layer 3 network. For example, FIG. 1 illustrates that AP 120c, 120d, 120e and 120f are indirectly connected to WLAN controllers 105c and 105d through access network 140b. In this example, access network 140b is a layer 3 network, such as a network including one or more routers using layer 3 IP addressing and messaging. In this example, WLAN controller 105c or WLAN controller 105d may not have a way to intercept the offer message with the global list of WLAN controllers from the configuration server 130. The offer message may already be routed by routers in access network 140b. For example, even when control frames from all VLANs are snooped, there is a chance the discover request frame from the AP is transmitted from one WLAN controller 105c or 105d while the offer message from the configuration server 130 is transmitted through a different WLAN controller 105c or 105d.

In an embodiment, Node 110c (including WLAN controller 105c) and Node 110d (including WLAN controller 105d) are associated with a controller group. When a WLAN controller in a same controller group intercepts a control frame in a snooped control VLAN (e.g., a DHCP message), the WLAN controller inserts its address and the address for other WLAN controllers in their same controller group into the control frame response from the configuration server 130. Hence, the WLAN controllers 105c and 105d each receive the offer message response from the configuration server destined to one of the APs 120c, 120d, 120e and 120f and may update the global list of WLAN controllers.

An example of the method 500 for establishing an association between an AP 120 and a WLAN controller 105 in mobility domain 135 when the AP 120 and WLAN controller 105 are indirectly connected by a layer 3 network is shown in FIG. 5. In this example, AP 120c initiates in step 505. In this embodiment as part of the initiation, AP 120c employs a connectivity discovery protocol to transmit messages that advertise its identity to other nodes in the network 110b in step 510. Through the connectivity discovery protocol message from AP 120c, network node 110e detects AP 120c and determines that it is directly connected to AP 120c in step 515. Network node 110e checks that AP 120c is included in a control VLAN for DHCP services.

AP 120c then transmits a discover request message to determine its IP address from configuration server 130 in step 520. The discover request message may include for example a DHCP discover message with a DHCP option 60 with VCI="VendorDeviceClassDescription". In this embodiment, both WLAN controllers 105c and 105d in the same controller group, snoop the control VLAN for the newly added AP 120c. When either WLAN controller 105c or WLAN controller 105d snoops or receives the discover request message, it inserts its address and the address for other WLAN controllers in their same controller group into the control frame response from the configuration server 130.

Upon receiving the discover request message, configuration server 130 is configured to return an offer message with a global list of WLAN controllers in step 525. The offer message may include for example a DHCP offer with DHCP option 40 with VSI=global list of WLAN controllers=IP address of one or more WLAN controllers. The global list of WLAN controllers from the configuration server 130 includes the IP addresses of one or more WLAN controllers 105 in mobility domain 135. The global list of WLAN controllers from the configuration server 130 is in an embodiment a static list.

In this embodiment, WLAN controller 105c and 105d are configured in a same controller group. When either WLAN controller 105c or 105d intercepts or "snoops" the offer message from configuration server 130 to AP 120c in step 530, the WLAN controller 105c or 105d that intercepts such message checks that the offer message is also transmitted to the other WLAN controller 105c or 105d in the controller group. WLAN controller 105c or 105d alters the global list of WLAN controllers in the offer message to create an altered list of WLAN controllers. The altered list of WLAN controllers includes the IP address of WLAN controllers 105c or 105d and other WLAN controllers in the controller group as the first IP addresses or highest priority addresses in the list. In step 535, WLAN controller 105b transmits the offer message with the altered list of WLAN controllers.

AP 120c receives the offer message and selects one of the IP addresses of a WLAN controller 105c or 105d or other controller in the same controller group listed first or given highest priority in the altered list of WLAN controllers, e.g. WLAN controller 105c or 105d. AP 120c in step 540 then requests association with (or adoption by) WLAN controller 105c or 105d to establish a control and data path connection. When AP 120c is associated with or adopted by the WLAN controller 105c or 105d, the associated WLAN controller 105 receives and manages AP wireless device connections, authentications, and other wireless services.

Using this interception process, AP 120c is thus influenced to select one of the indirectly connected WLAN controllers in a same controller group, such as WLAN controller 105c or 105d, for association even when the indirectly connected WLAN controllers are not initially on the global list of WLAN controllers or are not prioritized in the global list of WLAN controllers from the configuration server 130.

Figure 6:
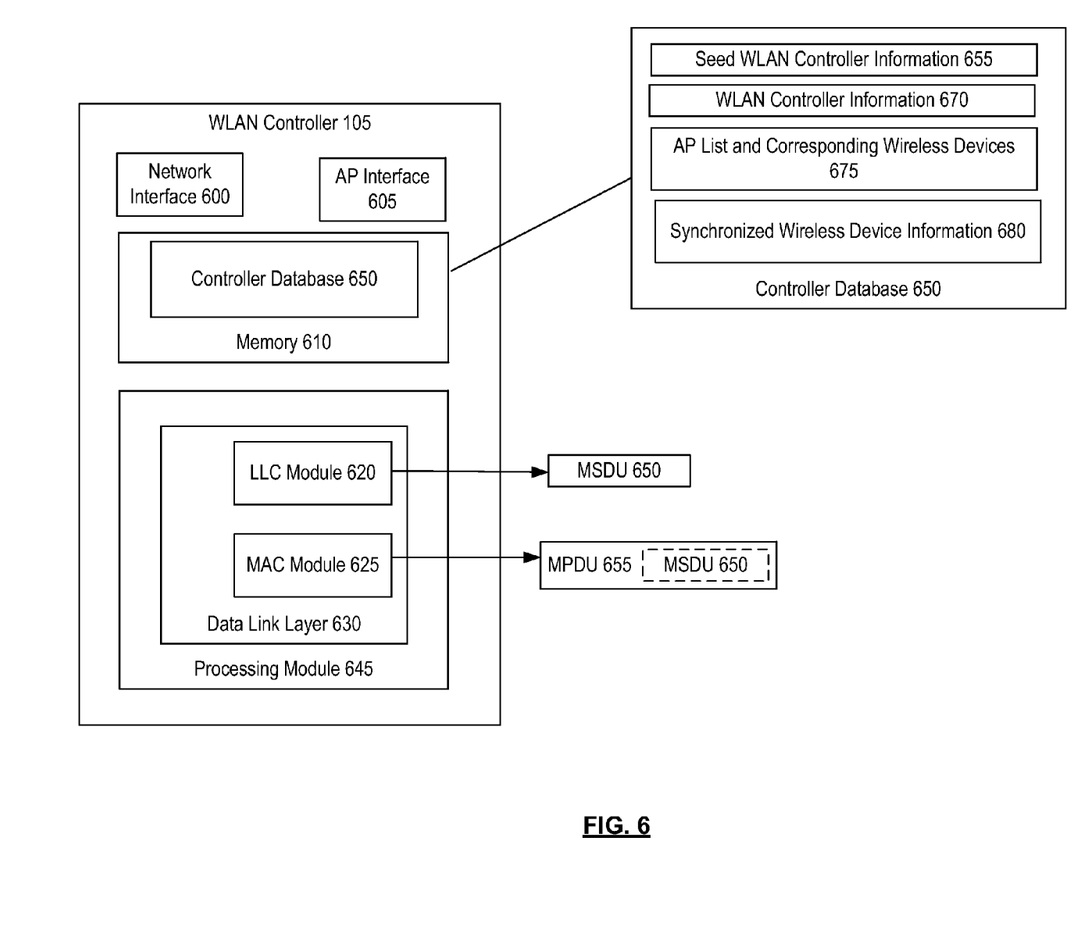
FIG. 6 illustrates a schematic block diagram of an embodiment of a WLAN controller in a wireless distributed network.

FIG. 6 illustrates a schematic block diagram of an embodiment of a WLAN controller 105 in a distributed wireless network 100. In an embodiment, WLAN controller 105 includes a network interface module 600 having at least one MAC port interface, such as an IEEE 802.1Q compliant network interface, operable to connect to a node 110. The AP interface module 605 is operable to connect to an AP 120 through a wired or wireless connection. In another embodiment, the WLAN controller 105 is incorporated into a node 110. The network interface module 600 may then be incorporated into the node 110. In addition, the AP interface may be incorporated into the node 110 as well, and the WLAN controller 105 is operable to connect to an AP 120 through the AP interface module 605 incorporated into the node 110.

WLAN controller 105 includes one or more processing modules 645 operable to perform the functions described herein with respect to the WLAN controllers 105. One or more processing modules 645 may also implement a logical link control (LLC) module 620, media access control (MAC) module 625. The LLC module 620 and MAC module 625 are part of a logical data link layer 630. The data link layer 630 is operable to encapsulate a layer 3 frame, such as IP frame, into a MAC Service Data Unit (MSDU) 650 and then encapsulate the MSDU into a MAC Protocol Data Unit (MPDU) 655 in accordance with a WLAN protocol.

The WLAN Controller 105 also includes one or more memories 610 that store one or more controller databases 650. The controller database 650 stores seed WLAN controller information 655 that includes IP addresses for the one or more seed WLAN controllers in mobility domain 135. Controller database 650 also stores WLAN controller information 670 that includes information for the other WLAN controllers 105 in mobility domain 135, such as IP addresses, MAC addresses and controller group identifiers for the other WLAN controllers. Controller database 650 also stores AP list and Corresponding Wireless devices 675 including information on associated APs 120 to the WLAN controller 105 and the mobile devices 125 associated and/or authenticated to those associated APs 120. The controller database 650 also includes synchronized wireless device information 680, such as authentication status, QOS policies, FW policies, ACLs, etc., of the wireless devices 125 that allows the wireless devices 125 to roam between the APs 120 adopted by the WLAN controllers 105 in mobility domain 135.

Figure 7:
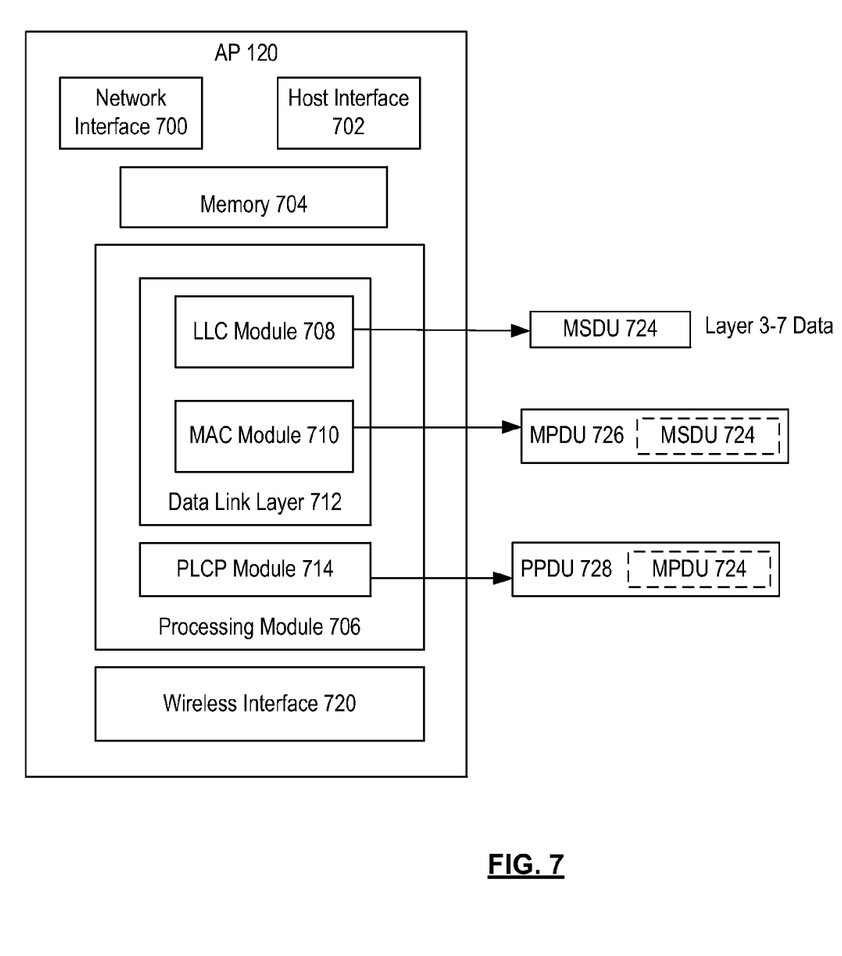
FIG. 7 illustrates a schematic block diagram of an embodiment of an access point.

FIG. 7 illustrates a schematic block diagram of an embodiment of an access point (AP) 120. In an embodiment, AP 120 includes a network interface module 700 having at least one MAC port interface, such as an IEEE 802.1Q compliant network interface, operable to connect to a node 110 or WLAN controller 105 in distributed wireless network 100. The host interface module 702 is operable to connect to a host device, if present. A peripheral interface module may also be included. In another embodiment, the network interface module 600 is incorporated into the host device and the AP 120 is operable to connect to the node 110 through a network interface module 600 in the host device. AP 120 includes a memory 704 and one or more processing modules 706 operable to perform the functions described herein with respect to the APs 120. The one or more processing modules 706 may also implement a logical link control (LLC) module 708, media access control (MAC) module 710 and a Physical Layer Convergence Procedure (PLCP) module 714. The LLC module 708 and MAC module 710 are part of a logical data link layer 712. The MAC module 710 is operable to encapsulate a MAC Service Data Unit (MSDU) 724 into a MAC Protocol Data Unit (MPDU) 726 in accordance with a WLAN protocol. The Physical Layer Convergence Procedure (PLCP) Module 714 is operable to convert the MPDU 726 (also known as a PSDU at layer 1) into a PLCP Protocol Data Unit (PPDU) 728 in accordance with a WLAN protocol. The wireless interface 720 is operable to convert the PPDU 728 into a plurality of radio frequency (RF) signals in accordance with one of a plurality of operating modes of the WLAN protocol.

Figure 8:
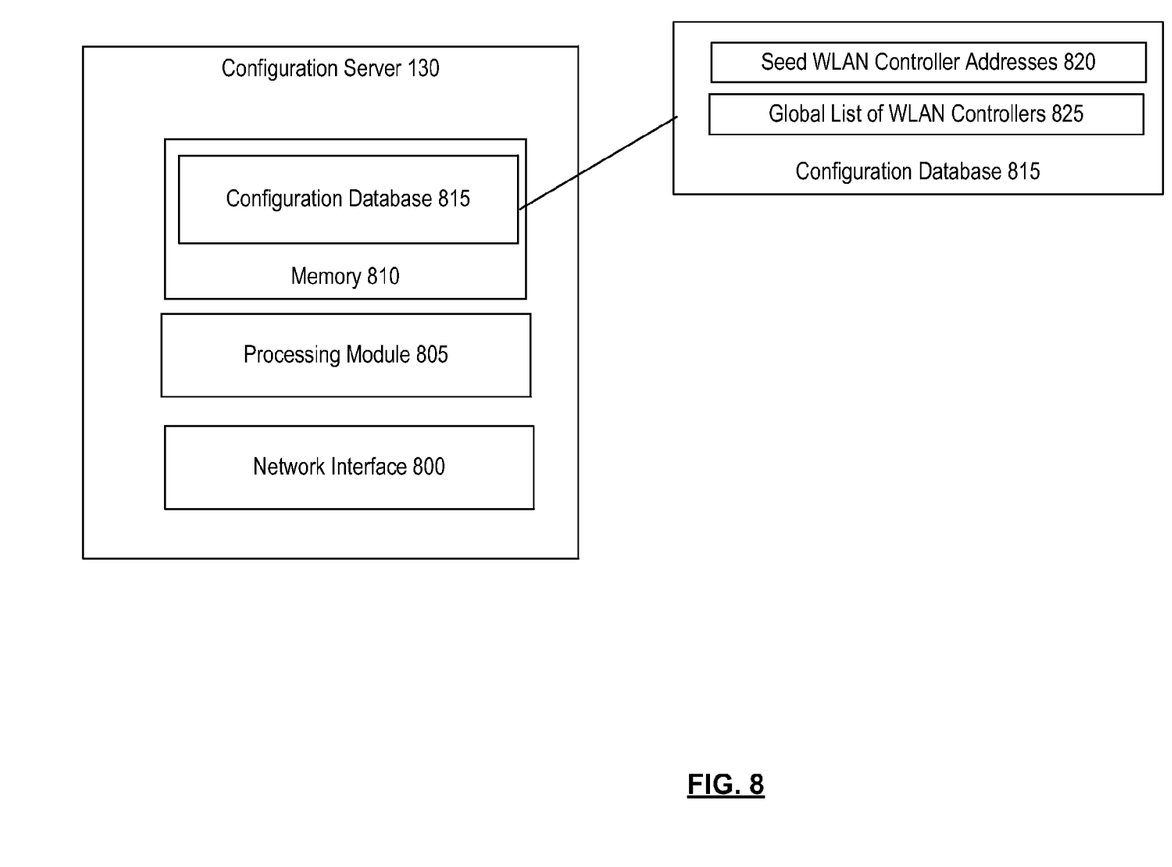
FIG. 8 illustrates a schematic block diagram of an embodiment of a configuration server in a wireless distributed network.

FIG. 8 illustrates a schematic block diagram of an embodiment of configuration server 130 in distributed network 100. Configuration server 130 may be a standalone device or may be incorporated into or include another device. Configuration server 130 includes a network interface module 800 having at least one network interface, such as a layer 3 or layer 2 MAC compliant network interface, operable to connect to a node 110 in distributed wireless network 100. Configuration server 130 includes one or more processing modules 805 operable to perform the functions described herein with respect to the configuration server 130. Configuration server 130 also includes one or more memories 810 that store one or more configuration databases 815. Configuration database 815 includes seed WLAN controller addresses 820 and global list of WLAN controllers 825. The seed WLAN controller addresses 820 includes IP addresses for the one or more seed WLAN controllers and associated mobility domain identifiers for the one or more seed WLAN controllers. The global list of WLAN controllers 825 includes a global list of WLAN controllers in mobility domain 135. Configuration server 130 may include seed WLAN controller addresses and a global list of WLAN controllers associated with a single mobility domain or include similar lists associated for each of a plurality of mobility domains. Configuration server 130 is operable to perform DHCP services or other type of service or protocol that provides configuration information to network nodes or has similar functionality as described herein with respect to configuration server 130.

The WLAN controllers 105 in mobility domain 135 are thus able to dynamically discover other WLAN controllers 105 in the same mobility domain across one or more L2 and/or L3 networks in order to synchronize wireless device information for a plurality of wireless devices associated with different APs 120 that are adopted by WLAN controllers across the distributed network. The synchronized wireless device information includes, e.g., authentication status, QOS policies, FW policies, ACLs, etc. and allows the APs 120 to forward data traffic, e.g. when inter-controller roaming occurs. This process facilitates seamless mobility as wireless devices 125 roam from one AP 120 adopted by a WLAN controller 105 in a first access network to another AP 120 adopted by another WLAN controller 105 in a second different access network in mobility domain 135. In addition, an embodiment described herein enhances the AP adoption process. When configuration server 130 provides a global list of WLAN controllers to an AP 120 during the adoption process, WLAN controllers 105 intercept or snoop the message from the configuration server 130 and alter the list to generate an altered list of WLAN controllers to affect the selection decision of the AP. The altered list re-orders or re-prioritizes the WLAN controllers as following with respect to the AP: directly connected WLAN controller, WLAN controllers from a same controller group, and then any remaining WLAN controllers in the global controller list provided by the configuration server 130. The WLAN controller 105 then transmits the altered list of WLAN controllers to the AP 120. This interception of the global list allows for dynamically updating the global list with newly deployed WLAN controllers 105 and for affecting the WLAN controller 105 selected for adoption by the AP 120.

The term "module" is used in the description of one or more of the embodiments of elements herein. A module includes hardware, such as one or more processing devices and/or one or more non-transitory memory devices operable to perform one or more functions as may be described herein. A module may operate independently and/or in conjunction with other modules and may utilize the processing device and/or memory of other modules and/or operational instructions of other modules. As also used herein, a module may contain one or more sub-modules, each of which may be one or more modules. A processing device includes a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The non-transitory memory device may be an internal memory or an external memory, and the memory may be a single memory device or a plurality of memory devices. The non-transitory memory device may be a read-only memory, random access memory, volatile memory, non-volatile memory, static memory, dynamic memory, flash memory, cache memory, and/or any non-transitory memory device that stores digital information. The various modules may implement one or more of its functions via a state machine, analog circuitry, digital circuitry, and/or logic circuitry. The non-transitory memory device may be embedded within, or external to, the circuitry comprising the state machine, analog circuitry, digital circuitry, and/or logic circuitry. A module may also include hard-coded instructions and/or software and/or operational instructions stored by an internal or external non-transitory memory device needed for execution by the module to perform the steps and/or functions described herein.

As may be used herein, the term "operable to" or "configurable to" indicates that an element includes one or more of modules, data, input(s), output(s), etc., to perform one or more of the described or necessary corresponding functions and may further include inferred coupling to one or more other items to perform the described or necessary corresponding functions. As may also be used herein, the term(s) "coupled", "coupled to", "connected to" and/or "connecting" or "interconnecting" includes direct connection or link between nodes/devices and/or indirect connection between nodes/devices via an intervening item (e.g., an item includes, but is not limited to, a component, an element, a circuit, a link, a module, a node, a switch, a router, other network element, etc.). As may further be used herein, inferred connections (i.e., where one element is connected to another element by inference) includes direct and indirect connection between two items in the same manner as "connected to".

Embodiments have also been described above with the aid of logical flow diagrams illustrating the performance of specified functions and method steps and relationships thereof. The boundaries and sequence of these functional building blocks and method steps have been arbitrarily defined herein for convenience of description. Alternate boundaries and sequences may be implemented and/or defined with similar functions and relationships. Any such alternate boundaries or sequences are thus within the scope and spirit of the claims. Similarly, flow diagram steps may also have been arbitrarily defined herein to illustrate certain significant functionality. To the extent used, the flow diagram steps and sequence can be defined otherwise and still perform similar functionality. Such alternate definitions of both functional building blocks and flow diagram steps and sequences are thus within the scope of the claims. One of average skill in the art will also recognize that the functional building blocks, and other illustrative blocks, modules and components herein, can be implemented as illustrated or by one or multiple discrete components, networks, systems, databases or processing modules executing appropriate software and the like or any combination thereof.

What is claimed is:

1. A wireless local area network (WLAN) controller in a mobility domain, comprising:
    at least one memory; and
    a processing module operable to:
        determine an address of at least one seed WLAN controller in the mobility domain;
        register with the at least one seed WLAN controller in the mobility domain by:
            transmitting a register request including a layer 3 address of the WLAN controller to the at least one seed WLAN controller with a mobility domain identifier of the mobility domain; and
            receiving a register acknowledgement from the at least one seed WLAN controller when the mobility domain identifier matches a mobility domain identifier of the at least one seed WLAN controller; and
        receive information for other WLAN controllers in the mobility domain from the at least one seed WLAN controller.

2. The WLAN controller of claim 1, wherein the information for other WLAN controllers in the mobility domain from the at least one seed WLAN controller includes at least an IP address for the other WLAN controllers in the mobility domain.

3. The WLAN controller of claim 1, wherein the WLAN controller is in a first access network and wherein the at least one seed WLAN controller is in a second, different access network.

4. The WLAN controller of claim 3, wherein the first access network includes at least one of: a layer 2 network and a layer 3 network and wherein the second, different access network includes at least a different one of: a layer 2 network and a layer 3 network.

5. The WLAN controller of claim 4, wherein the processing module is further operable to:
    receive synchronized wireless device information from the at least one seed WLAN controller in the mobility domain.

6. The WLAN controller of claim 5, wherein the synchronized wireless device information includes information to allow a wireless device to roam between a first AP adopted by the WLAN controller in the first access network and a second AP adopted by the seed WLAN controller in the second, different access network.

7. The WLAN controller of claim 1, wherein the processing module is operable to determine an address of at least one seed WLAN controller in the mobility domain by:
    transmitting a discover request to a configuration server; and
    receiving a discover response that includes the address of the at least one seed WLAN controller.

8. A method for discovery by a WLAN controller in a mobility domain, comprising:
    determining a layer 3 address of at least one seed WLAN controller in the mobility domain;

registering with the at least one seed WLAN controller in the mobility domain;
receiving information for other WLAN controllers in the mobility domain from the at least one seed WLAN controller;
receiving synchronized wireless device information from the at least one seed WLAN controller in the mobility domain;
transmitting a register request including a layer 3 address of the WLAN controller to the at least one seed WLAN controller with a mobility domain identifier of the mobility domain; and
receiving a register acknowledgement from the at least one seed WLAN controller when the mobility domain identifier matches a mobility domain identifier of the at least one seed WLAN controller.

9. The method of claim 8, wherein the information for other WLAN controllers in the mobility domain from the at least one seed WLAN controller includes at least an IP address for the other WLAN controllers in the mobility domain.

10. The method of claim 8, wherein the WLAN controller is in a first access network and wherein the at least one seed WLAN controller is in a second, different access network.

11. The method of claim 10, wherein the first access network includes at least one of: a layer 2 network and a layer 3 network and wherein the second, different access network includes at least a different one of: a layer 2 network and a layer 3 network.

12. A method for discovery by a WLAN controller in a mobility domain, comprising:
determining a layer 3 address of at least one seed WLAN controller in the mobility domain;
registering with the at least one seed WLAN controller in the mobility domain;
receiving information for other WLAN controllers in the mobility domain from the at least one seed WLAN controller;
receiving synchronized wireless device information from the at least one seed WLAN controller in the mobility domain;
intercepting a control message from a configuration server to an access point by the WLAN controller, wherein the control message includes a global list of WLAN controllers;
altering the global list of WLAN controllers to generate an altered list of WLAN controllers; and
transmitting the control message to the access point with the altered list of WLAN controllers.

13. The method of claim 12, wherein the AP is directly connected to the WLAN controller; and
wherein altering the global list of WLAN controllers to generate an altered list of WLAN controllers includes:
inserting an address of the WLAN controller; and
re-prioritizing the global list of WLAN controllers such that the address of the WLAN controller has a highest priority address in the altered list of WLAN controllers.

14. The method of claim 12, wherein the AP is indirectly connected to the WLAN controller; and
wherein altering the global list of WLAN controllers to generate an altered list of WLAN controllers includes:
inserting an address of the WLAN controller; and
re-prioritizing the global list of WLAN controllers such that the address of the WLAN controller has a highest priority address in the altered list of WLAN controllers.

15. A WLAN controller in a mobility domain, comprising:
at least one memory; and
at least one processing module operable to:
register with the at least one seed WLAN controller in the mobility domain;
receive address information for other WLAN controllers in the mobility domain from the at least one seed WLAN controller;
receive synchronized wireless device information from the at least one seed WLAN controller in the mobility domain;
intercept a control message from a configuration server to an access point, wherein the control message includes a global list of WLAN controllers in the mobility domain;
alter the global list of WLAN controllers to generate an altered list of WLAN controllers; and
transmit the control message to the access point with the altered list of WLAN controllers.

16. The WLAN controller of claim 15, wherein the processing module is further operable to determine an address of at least one seed WLAN controller in the mobility domain by:
transmitting a register request including a layer 3 address of the WLAN controller to the at least one seed WLAN controller with a mobility domain identifier of the mobility domain; and
receiving a register acknowledgement from the at least one seed WLAN controller when the mobility domain identifier matches a mobility domain identifier of the at least one seed WLAN controller.

17. The WLAN controller of claim 15, wherein the WLAN controller is in a first access network that includes at least one of: a layer 2 network and a layer 3 network and wherein the at least one seed WLAN controller is in a second, different access network that includes at least a different one of: a layer 2 network and a layer 3 network.

18. The WLAN controller of claim 17, wherein the synchronized wireless device information includes information to allow a wireless devices to roam between a first AP adopted by the WLAN controller in the first access network and a second AP adopted by the seed WLAN controller in the second, different access network.

* * * * *